United States Patent [19]  [11] 4,115,240
Asawa et al.  [45] Sep. 19, 1978

[54] METHOD OF REGENERATING ELECTROCHEMICAL PROPERTIES OF CATION EXCHANGE MEMBRANE OF FLUORINATED POLYMER

[75] Inventors: Tatsuro Asawa; Tomoki Gunjima, both of Yokohama, Japan

[73] Assignee: Asahi Glass Company Ltd., Tokyo, Japan

[21] Appl. No.: 847,909

[22] Filed: Nov. 2, 1977

[51] Int. Cl.$^2$ ............................................. C25B 13/08
[52] U.S. Cl. ..................... 204/296; 204/98; 204/128
[58] Field of Search .......................... 204/98, 128, 296

[56] References Cited

U.S. PATENT DOCUMENTS 4,051,002  9/1977  Gunjima et al. ....................... 204/98

Primary Examiner—R. L. Andrews
Attorney, Agent, or Firm—Oblon, Fisher, Spivak, McClelland & Maier

[57] ABSTRACT

Electrochemical properties of a cation exchange membrane of a carboxylic acid type fluorinated polymer which is used for an electrolysis of an aqueous solution of an alkali metal chloride is recovered by converting ion exchange groups of $\text{(COO)}_{\overline{m}}\text{M}$; wherein M represents an alkali metal or an alkaline earth metal; and $m$ represents a valence of M; to the corresponding acid or ester groups of —COOR wherein R represents hydrogen or a $C_1$ – $C_5$ alkyl group and heat-treating the fluorinated polymer having the groups of —COOR.

12 Claims, No Drawings

METHOD OF REGENERATING ELECTROCHEMICAL PROPERTIES OF CATION EXCHANGE MEMBRANE OF FLUORINATED POLYMER

BACKGROUND OF THE INVENTION

1. Field of the Invention

The present invention relates to a method of recovering electrochemical properties of a cation exchange membrane of fluorinated polymer used for an electrolysis of an alkali metal chloride. More particularly, it relates to a method of recovering electrochemical properties of a cation exchange membrane of fluorinated polymer which has deteriorated electrochemical properties caused by producing an alkali metal hydroxide and chlorine gas by an electrolysis of an aqueous solution of an alkali metal chloride.

2. Description of the Prior Art

It has been known to produce chlorine in an anode compartment and alkali metal hydroxide in a cathode compartment by partitioning the anode compartment and the cathode compartment with a diaphragm and feeding an aqueous solution of an alkali metal chloride into the anode compartment to electrolyze it. The method has been known as a two-compartment type diaphragm electrolysis.

Heretofore, an asbestos diaphragm has been usually used in the method. When the asbestos diaphragm is used, the resulting alkali metal hydroxide is contaminated with an alkali metal chloride to lower the purity and the asbestos has low durability.

Thus, it has been proposed to use a cation exchange membrane of fluorinated polymer which does not substantially pass the electrolyte and selectively pass only alkali metal ions and has high alkali resistance and chlorine resistance.

It has been found that the cation exchange membranes of the carboxylic acid type fluorinated polymer are superior to cation exchange membranes of the sulfonic acid type fluorinated polymer as the diaphragm for the electrolysis of an aqueous solution of an alkali metal chloride because the alkali metal hydroxide can be produced in high current efficiency even though the concentration is high and the electric resistance of the membrane is not increased.

Thus it has been found that higher than 90% of the current efficiency can be given under the cell voltage of 2.5 to 4.0 volts, even though the concentration of the alkali metal hydroxide is high to be 35 to 45wt. %, when an aqueous solution of an alkali metal chloride is electrolyzed by using the cation exchange membrane of the carboxylic acid type fluorinated polymer as the diaphragm.

However, when the electrolysis is continued for a long time, the electrochemical properties such as the current efficiency and the cell voltage of the cation exchange membrane of the carboxylic acid type fluorinated polymer are gradually deteriorated. The reason is not clear, however, it has been considered that the deterioration of the electrochemical properties has been caused by a change of mechanical property and a precipitation of sparingly soluble calcium and magnesium hydroxides on or in the membrane under the condition of the electrolysis.

The deterioration of the electrochemical properties of the membrane substantially prevent an industrial use of the membrane in the electrolysis. The cost of the membrane is relatively high. Accordingly, it has been important to recover the electrochemical properties of the membrane by reproducing the cation exchange membrane.

SUMMARY OF THE INVENTION

It is an object of the present invention to provide a novel process for overcoming the problem to recover the deteriorated electrochemical properties of a cation exchange membrane of a carboxylic acid type fluorinated polymer used for an electrolysis of an alkali metal chloride.

It is another object of the present invention to provide a method of recovering electrochemical properties of a cation exchange membrane of a carboxylic acid type fluorinated polymer by a simple and economical method.

The foregoing and other objects of the present invention have been attained by recovering electrochemical properties of a cation exchange membrane of a carboxylic acid type fluorinated polymer having ion exchange groups of $-(COO)_mM$ wherein M represents an alkali metal or an alkaline earth metal; and $m$ represents a valence of M, which is used for an electrolysis of an alkali metal chloride, by converting the ion exchange groups of $-(COO)_mM$ to the corresponding acid or ester groups of $-COOR$ wherein R represents hydrogen or $C_1-C_5$ alkyl group, and heat-treating the acid or ester type fluorinated polymer, preferably, in a molten condition.

DETAILED DESCRIPTION OF PREFERRED EMBODIMENTS

In accordance with the process of the present invention, the electrochemical properties of the membrane deteriorated in an electrolysis can be substantially recovered from the viewpoints of a cell voltage and a current efficiency by a relatively simple treatment. Thus, the treatment for recovery of the membrane can be repeated for several times whereby the life-time of the cation exchange membrane is remarkably prolonged advantageously.

The method of the present invention will be further illustrated in detail.

The cation exchange membrane of the carboxylic acid type fluorinated polymer which can be recovered by the method of the present invention should have ion exchange groups of $-(COO)_mM$; wherein M represents an alkali metal or alkaline earth metal; and $m$ represents a valence of M; in an electrolysis of an aqueous solution of an alkali metal chloride. It is preferable that M is the same with the alkali metal of the alkali metal chloride in the electrolysis.

The ion exchange capacity of the cation exchange membrane is important because it relates to the electrochemical properties of the membrane in the electrolysis. Suitable ion exchange capacity is depending upon a kind of the fluorinated polymer and is preferably in a range of 0.5 to 2.5 meq/g polymer. When the ion exchange capacity is too low, the ion exchange property is too low and the electric resistance is too high. On the other hand, when the ion exchange capacity is too high, the water content is too high and the current efficiency is too low, disadvantageously, the ion exchange capacity is preferably in a range of 0.8 to 2.0 meq/g polymer especially 1.0 to 1.8 meq/g polymer from the viewpoints of the mechanical and electrochemical properties of the membrane.

The cation exchange membranes of the fluorinated polymer can be fabricated by using various fluorinated copolymers. It is especially preferable to use copolymers produced by copolymerizing fluorinated olefin monomer and a comonomer having a functional group of carboxylic acid group or a group which can be converted to carboxylic acid group (hereinafter referring to as a carboxylic acid type functional group).

The fluorinated olefin monomers and the comonomers having the carboxylic acid type functional group can be selected as desired and especially can be selected respectively to form the units of $$+CF_2-CXX'+ \quad (a)$$

and $$(b) \quad +CF_2-CX+ \\ \phantom{xxxxx} | \\ \phantom{xxxxx} Y$$

wherein
X represents fluorine, chlorine, hydrogen or $-CF_3$;
X' represents X or $CF_3(CF_2)_m$;
m represents 1 to 5; and Y represents $-PA$ or $-O-(CF_2)_n(P, Q, R)-A$,
wherein
P represents $+CF_2+_a+CXX'+_b+CF_2+_c$
Q represents $+CF_2-O-CXX'+_d$;
R represents $+CXX'-O-ACF+_e$;
P,Q and R are arranged in optional order;
X and X' are defined above;
n represents 0 or 1;
a, b, c, d and e respectively represent 0 to 6;
A represents $-COOH$ or $-CN$, $-COF$, $-COOR_1$, $-COOM$, $-CONR_2R_3$ which can be converted to $-COOH$ by hydrolysis or neutralization;
$R_1$ represents a $C_1-C_{10}$ alkyl group;
M represents an alkali metal or quaternary ammonium group;
and $R_2$ and $R_3$ respectively hydrogen or a $C_1-C_{10}$ alkyl group.

Suitable groups of Y include $$+CF_2 \overline{)_x} A, \ -O+CF_2 \overline{)_x} A, \ +O-CF_2-CF \overline{)_x} A, \\ \phantom{xxxxxxxxxxxxxxxxxxxxxxxxxxxxxxx} | \\ \phantom{xxxxxxxxxxxxxxxxxxxxxxxxxxxxxxx} Z$$

$$+O-CF_2-CF\overline{)_x}+O-CF_2-CF\overline{)_y}A \\ \phantom{xxxxx} | \phantom{xxxxxxxxxxxxx} | \\ \phantom{xxxxx} Z \phantom{xxxxxxxxxxxxx} R_f$$

$$-O-CF_2+CF-O-CF_2\overline{)_x}+CF_2\overline{)_y}+CF_2-O-CF\overline{)_z}A \\ \phantom{xxxxxxx} | \phantom{xxxxxxxxxxxxxxxxxxxxxxxxxxxx} | \\ \phantom{xxxxxxx} Z \phantom{xxxxxxxxxxxxxxxxxxxxxxxxxxxx} R_f$$

wherein
x, y and z respectively represent 1 to 10 and Z and $R_f$ represent respectively $-F$ or a $C_1-C_{10}$ perfluoroalkyl group; A is defined above. In the groups of Y, A is bonded to a fluorinated carbon group.

The copolymers having the units of (a) and (b) preferably comprises 1 to 40 mole %, especially 3 to 25 mole % of the units of (b) so as to give the above-mentioned range of the ion exchange capacity of the membrane.

The molecular weight of the fluorinated polymer for the cation exchange membrane of the present invention is important as it depends upon the mechanical and electrochemical characteristics of the membrane. When the molecular weight is shown by the temperature ($T_Q$) to give a volumetric melt flow rate of 100m$^3$/sec. which is below defined, it is preferable to have high molecular weight to give $T_Q$ of 130° to 380° C., especially 180° to 320° C.

In the preparation of the copolymers, it can be modified by using two or more monomers or adding a third monomer. For example, the flexibility is imparted by combining α-olefin compound such as ethylene, propylene, and butene and $CF_2 = CFOR_f$ wherein $R_f$ represents a $C_1-C_{10}$ perfluoroalkyl group. For example, improved mechanical strength can be imparted by crosslinking the copolymer by combining a divinyl monomer such as $$CF_2 = CF-CF = CF_2,$$

$$CF_2 = CFO(CF_2)_{1-4}OCF = CF_2.$$

The copolymerization of the fluorinated olefin with the comonomer having the carboxylic acid type functional group or the third monomer, can be carried out by suitable conventional methods.

The copolymerization can be carried out by a catalytic polymerization, a thermal polymerization or a radiation-induced polymerization by using a solvent such as halogenated hydrocarbons, if necessary.

The cation exchange membrane of the fluorinated polymer can be prepared by the conventional process for fabricating a membrane such as a press-molding method, a roll-molding method, an extrusion method, a solution spreading method, a dispersion molding method and a powder molding method, to give a thickness of 20 to 600μ preferably 50 to 400μ.

When the copolymer having functional groups which can be converted to carboxylic acid groups is produced, the functional groups should be converted to carboxylic acid groups by suitable treatment before or after the step of fabrication of membrane. For example, when the functional groups are $-CN$, $-COF$, $-COOR_1$, $-COOM$, $-CONR_2R_3$ wherein M and $R_1$ to $R_3$ are defined above, the functional groups are converted to carboxylic acid groups by hydrolysis or neutralization with an alcohol solution of an acid or a base. When the functional groups are double bonds, they are converted to carboxylic acid groups after reacting them with $COF_2$.

The cation exchange membrane of the fluorinated polymer can be produced by blending a polymer of olefin such as polyethylene polypropylene, preferably, polytetrafluoroethylene or a fluorinated copolymer of ethylene and tetrafluoroethylene to the carboxylic acid type fluorinated polymer in the step of fabrication of the membrane. It is also possible to reinforce the cation exchange membrane with a supporter of a fabric such as a cloth and a net; a nonwoven fabric or a porous film which is made of said polymer.

When the cation exchange membrane is reinforced with fibriles made of polytetrafluoroethylene or a copolymer of tetrafluoroethylene which are formed by applying share stress, the cation exchange membrane having excellent mechanical strength, especially, bending strength and tear strength can be obtained. The fibriles of the polytetrafluoroethylene or the copolymer of tetrafluoroethylene are incorporated at a ratio of 1 to 25 preferably 2 to 10 wt. parts per 100 wt. parts of the carboxylic acid type fluorinated polymer. The fibriles are preferably made from the powder of polytetrafluoroethylene having a specific surface area of 3 to 30 m$^2$/g, especially 6 to 20 m$^2$/g and a particle diameter of less than 5μ preferably 0.03 to 3μ which is obtained by an emulsion polymerization. The weight of the blended polymer and the supporter of the polymer is not calculated for the ion exchange capacity.

When the cation exchange membrane of the fluorinated polymer is used for the electrolysis of an aqueous solution of an alkali metal chloride, the carboxylic acid groups of the fluorinated polymer are converted to $-(COO)_{\overline{m}}M$ (M and $m$ are defined above). When the cation exchange membrane is used for the electrolysis of an aqueous solution of an alkali metal chloride during a long time, the electrochemical properties of the membrane are changed for example, the cell voltage is raised and the current efficiency is decreased, depending upon the time of the electrolysis. The reason of deterioration of the electrochemical properties of the cation exchange membrane is discussed above, and is not completely clear. The deterioration is remarkable, when the cation exchange membrane is used for 300 to 500 days or more, as it is clearly understood from the data in the following examples.

In accordance with the present invention, the deteriorated properties of the cation exchange membrane of the fluorinated polymer caused by the long use, can be recovered by the following treatment.

The ion exchange groups of $-(COO)_{\overline{m}}M$ of the fluorinated polymer are converted to —COOR groups (R represents hydrogen or a $C_1$-$C_5$ alkyl group). The conversion of the ion exchange groups can be attained by suitable conventional methods depending upon the kind of R. When R is H, that is the —COOH acid type, the membrane is contacted with an aqueous solution of an acid or an organic acid preferably in the presence of a polar organic compound.

Suitable inorganic acids include hydrochloric acid, sulfuric acid, nitric acid, phosphoric acid etc. Suitable organic acids include acetic acid, propionic acid, perfluoroacetic acid etc. The inorganic acid or the organic acid is preferably used as an aqueous solution at a concentration of 0.5 to 90 wt. % especially 1.0 to 30 wt. %.

The calcium and magnesium hydroxides deposited on or in the membrane are solubilized out into the acid solution by contacting the membrane with an aqueous solution of an acid.

Suitable polar organic compounds include methanol, ethanol, ethyleneglycol, dimethylsulfoxide, acetic acid, phenol etc. The polar organic compound is preferably incorporated at a concentration of 5 to 90 wt. %. The contact treatment is preferably carried out at the reaction temperature of 10° to 120° C. for 30 minutes to 20 hours to easily attain the conversion of the ion-exchange groups.

When R is a $C_1$-$C_5$ alkyl group, the ion-exchange groups are converted to carboxylic acid groups by said treatment and then, the carboxylic acid groups are converted to ester groups by reacting them with an alcohol, or the carboxylic acid groups are converted to acid halide groups by the reaction with phosphorus trichloride, phosphorus oxychloride or thionyl chloride, etc. and then the acid halide groups are converted to ester groups by reacting them with an alcohol, or the carboxylic acid groups are converted to acid anhydride groups by the reaction with acetic anhydride or perfluoroacetic anhydride, etc., and then, the acid anhydride groups are converted to ester groups by reacting them with the alcohol.

It is also possible to convert the ion exchange groups of $-(COO)_{\overline{m}}M$ to the acid anhydride thereof and then, to react them with an alcohol. The acid anhydride can be easily formed by contacting with thionyl chloride, phosphorus trichloride or phosphorus oxychloride at 0° to 120° C. for 1 to 25 hours.

Suitable alcohols used for esterification of the acid halide or the acid anhydride, include alcohols having 1 to 5 carbon atoms such as methanol, ethanol, propanol, butanol etc. The esterification is carried out by immersing the membrane whose ion exchange groups are converted to the acid halide or the acid anhydride, into the alcohol in the presence of an inorganic or organic acid which can be the same or different one used in the conversion of $-(COO)_{\overline{m}}M$ to carboxylic acid groups. The immersing treatment is preferably carried out at 30° to 120° C. for 30 minutes to 40 hours.

The conversion of the ion exchange groups of $-(COO)_{\overline{m}}M$ to —COOR can be also carried out after pulverizing the cation exchange membrane in a form of powder or granules. In this case, the conversion can be effectively and uniformly carried out and the following heat treatment is effectively carried out.

Thus, the heat treatment is carried out after the conversion of the ion exchange groups of $-(COO)_{\overline{m}}M$ to —COOR. The heat treatment can be carried out in the form of the membrane with or without suitable heat transfer medium such as an alloy having low melting point. However, in order to attain superior effect of the present invention by the uniform heat treatment, it is preferable to carry out the heat treatment after pulverizing the membrane to melt the fluorinated polymer and to mold the membrane. Said pulverizing of the membrane can be carried out before the conversion of the ion-exchange group of $-(COO)_{\overline{m}}M$ to —COOR. The heat treatment of pulverized membrane is especially preferable because the effect of recovery of the electrochemical properties is remarkably high and the process also is not complicated. It is also possible to blend a newly produced fluorinated polymer having ion-exchange groups of —COOR to the pulverized powder or granules of the fluorinated polymer before the heat treatment.

The heat treatment can be preferably carried out at higher than the temperature giving a volmetric melt flow rate of 0.1 mm³/second preferably 1.0 mm³/second and lower than the thermal decomposition temperature of the fluorinated polymer which is usually 360° to 400° C. When the heat treatment is carried out at lower than said temperature, the recovery of the electrochemical properties is not enough. Thus, the heat treatment is preferably carried out at higher than 130° C. and lower than the thermal decomposition temperature of the fluorinated polymer, especially in a range of 150° to 300° C. The time for the heat treatment is depending upon the kind of the fluorinated polymer for the membrane and the thickness of the membrane and the method of the heat treatment and it is preferable in a range of 1 minutes to 5 hours, especially 2 minutes to 1 hour. The heat treatment is preferably carried out under the pressure of 1.5 to 100 kg/cm² to retain the form of the membrane. When the heat treatment and the fabrication of the membrane are simultaneously carried out, they are carried out at 150° to 300° C. under the pressure of 5 to 300 Kg/cm² for 1 minute to 5 hours by a press-molding method, an extrusion method, a roll-molding method, and a powder-molding method or a dispersion-molding method.

The process for producing an alkali metal hydroxide by an electrolysis of an aqueous solution of an alkali metal chloride can be the conventional processes, for example, the electrolysis is carried out at 80° to 120° C. in a cell voltage of 2.3 to 5.5 volt and a current density of 10 to 100 A/dm$^2$ with an aqueous solution of an alkali metal chloride at a concentration of 2.5 to 4.5 N in an anode compartment. The anode used in the electrolysis can be graphite or an anticorrosive electrode having demensional stability which is made of a titanium substrate coated with a platinum group metal or an oxide of a platinum group metal. The electrolyte cell system can be unipolar or multipolar type.

A further understanding can be obtained by reference to certain specific examples which are provided herein for purposes of illustration only and are not intended to be limiting unless otherwise specified.

In the examples, a volumetric melt flow rate is defined as follows.

A 1 g of a sample of the copolymer is extruded through a nozzle having a diameter of 1 mm and a length of 2 mm under a predetermined pressure of 30 Kg/cm$^2$ at a predetermined temperature. The volumetric melt flow rate is shown by the amount of polymer flowed in the unit of mm$^3$/sec.

An ion exchange capacity of a cation exchange membrane was measured as follows.

A H-type cation exchange membrane was immersed into 1N—HCl at 60° C. for 5 hours to completely convert it to H-type membrane, and then the membrane was washed with water so as to be free of HCl. Then, 0.5 g of the H-type membrane was immersed into a solution prepared by adding 25 ml of water to 25 ml of 0.1N—NaOH. Then the membrane was taken out and the amount of NaOH in the solution was measured by a back titration with 0.1N—HCl.

EXAMPLE 1

Tetrafluoroethylene and $$CF_2=CFO-CF_2=CF-O(CF_2)_3-COOCH_3$$
$$\phantom{CF_2=CFO-CF_2=C}\vert$$
$$\phantom{CF_2=CFO-CF_2=CF-}CF_3$$

were copolymerized with a catalyst of azobisisobutyronitrile in trichlorotrifluoroethane to obtain a fluorinated copolymer having an ion-exchange capacity of 1.17 meq/g polymer and $T_Q$ of 190° C. The resulting fluorinated polymer was press-molded to form a film having a thickness of 200μ. The membrane was hydrolyzed in an aqueous methanol solution of sodium hydroxide whereby a carboxylic acid type fluorinated cation exchange membrane was obtained.

Two compartment type electrolytic cell was prepared by partitioning an anolyte and a catholyte with the cation exchange membrane and using an anode of titanium coated with rhodium and a cathode made of stainless steel with a space of the electrodes of 2.2 cm and an effective area of 25 cm$^2$. The electrolysis of sodium chloride was carried out under the following conditions.

The anode compartment was filled with 4N—NaCl aqueous solution and the cathode compartment was filled with 12N—NaOH aqueous solution. The electrolysis was carried out by feeding 4N—NaCl aqueous solution at a rate of 150 cc/hour into an anode compartment and feeding water into a cathode compartment so as to result 14.4N—NaOH aqueous solution with a current density of 20A/dm$^2$ at 85° C.

The aqueous solution of sodium chloride was overflowed from the anode compartment and the current efficiency was measured from the amount of NaOH which was produced by the electrolysis. The electrolysis was continued for 360 days and the electrolytic cell was disassemble and the membrane having deteriorated properties was taken out and was treated in a 1N—HCl solution containing 20% of dimethyl sulfoxide at 90° C. for 16 hours to convert the ion-exchange groups to acid type groups. The membrane was pulverized in hammer mill to obtain powder (100μ) of acid type cation exchange resin and the powder was pressmolded at 210° C. under the pressure of 50 Kg/cm$^2$ for 5 minutes to obtain a cation exchange membrane having a thickness of 200μ, and it was used for the electrolysis of an aqueous solution of sodium chloride in the same condition.

On the other hand, the powder of the acid type exchange resin was treated in methanol containing 1% HCl at 60° C. for 16 hours to convert the ion exchange groups to methyl ester groups and the powder was press-molded at 280° C. under the pressure of 60 Kg/cm$^2$ for 5 minutes to obtain a cation exchange membrane having a thickness of 200μ, and it was used for the electrolysis of an aqueous solution of sodium chloride in the same condition.

In Table 1, the properties of the membranes at the initiation or after using it for 360 days and the properties of the membrane reproduced by the heat treatment in the acid type or the heat treatment in the ester type are shown.

EXAMPLE 2

Tetrafluoroethylene and $CF_2 = CFO-(CF_2)_3COOCH_3$ were copolymerized with a catalyst of azobisisobutyronitrile to obtain a fluorinated copolymer having an ion-exchange capacity of 1.45 meq/g polymer and $T_Q$ of 235° C. The copolymer was press-molded to obtain a film having a thickness of 200μ and it was hydrolyzed in an aqueous methanol solution of sodium hydroxide to obtain a carboxylic acid type fluorinated cation exchange membrane. In accordance with the process of Example 1, the electrolysis of an aqueous solution of sodium chloride was carried out by using the cation exchange membrane. After continuing the electrolysis for 360 days, the electrolytic cell was disassembled and the membrane having deteriorated properties was taken out and treated in 1N—HCl at 100° C. for 10 hours and then, further treated in 1N—HCl at 90° C. for 16 hours to convert the ion-exchange groups to acid type groups.

Then, the membrane was pulverized in hammer mill to obtain a H type powder (100μ) and the powder was press-molded at 210° C. under the pressure of 50 Kg/cm$^2$ for 5 minutes to obtain a membrane having a thickness of 200μ and it was used for the electrolysis of an aqueous solution of sodium chloride in the same condition.

On the other hand, the powder of the acid type cation exchange resin was treated in methanol containing 1% HCl at 60° C. for 16 hours to convert the ion exchange groups to methyl ester groups and the powder was press-molded at 200° C. under the pressure of 60 Kg/cm$^2$ for 5 minutes to obtain a cation exchange membrane having a thickness of 200μ and it was used for the electrolysis of an aqueous solution of sodium chloride in the same condition.

In Table 1, the properties of the membranes at the initiation or after using it for 360 days and the properties of the membrane reproduced by the heat treatment in the acid type or the heat-treatment in the ester type are shown.

EXAMPLE 3

Tetrafluoroethylene, $CF_2=CFO-(CF_2)_3COOCH_3$ (A) and $CF_2=CFOCF_2CF(CF_3)O(CF_2)_3COOCH_3$ (B) were copolymerized with a catalyst of azobisisobutyronitrile to obtain a fluorinated copolymer (mole ratio of A/B = 4/1) having an ion-exchange capacity of 1.45 meq/g polymer and $T_Q$ of 220° C. The copolymer was press-molded to obtain a film having a thickness of 200μ and it was hydrolyzed in an aqueous methanol solution of sodium hydroxide to obtain a carboxylic acid type fluorinated cation exchange membrane. In accordance with the process of Example 1, the electrolysis of an aqueous solution of sodium chloride was carried out by using the cation exchange membrane. After continuing the electrolysis for 360 days, the electrolytic cell was disassembled and the membrane having deteriorated properties was taken out and treated in 1N—HCl at 100° C. for 10 hours and then, further treated in 1N—HCl containing 20% of dimethylsulfoxide at 90° C. for 16 hours to convert the ion exchange groups to acid type groups.

Then, the membrane was press-molded at 150° C. under the pressure of 50 Kg/cm² for 5 minutes to obtain a membrane having a thickness of 200μ and, it was used for the electrolysis of an aqueous solution of sodium chloride in the same condition.

On the other hand, the powder of the acid type cation exchange resin was treated in methanol at 60° C. for 16 hours to convert the ion-exchange groups to methyl ester groups and the powder was press-molded at 180° C. under the pressure of 60 Kg/cm² for 5 minutes to obtain a cation exchange membrane having a thickness of 200μ, and it was used for the electrolysis of an aqueous solution of sodium chloride in the same condition.

In Table 1, the properties of the membranes at the initiation or after using it for 360 days and the properties of the membrane reproduced by the heat treatment in the acid type or the heat treatment in the ester type are shown.

EXAMPLE 4

Tetrafluoroethylene and $CF_2=CFO(CF_2)_3COOCH_3$ were copolymerized with a catalyst of ammonium persulfate in water to obtain a fluorinated copolymer having an ion-exchange capacity of 1.20 meq/g polymer and $T_Q$ of 210° C. The copolymer were extruded to obtain a film having a thickness of 250μ and width of 15 cm. The film was plied to a cloth made of a copolymer of tetrafluoroethylene and ethylene (50 mesh: thickness 150μ) and compress-molded to form a reinforced film and it was hydrolyzed in an aqueous methanol solution of sodium hydroxide to obtain a carboxylic acid type fluorinated cation exchange membrane. In accordance with the process of Example 1, the electrolysis of an aqueous solution of sodium chloride was carried out at 105° C. by using the cation exchange membrane. After continuing the electrolysis for 360 days, the membrane having deteriorated properties was taken out and treated in 1N—HCl at 100° C. for 10 hours and then, further treated in hydrochloric acid containing 20% of acetic acid at 90° C. for 5 hours to convert the ion-exchange groups to acid type groups.

Then, the acid type membrane was press-molded at 200° C. under the pressure of 20 Kg/cm² for 5 minutes to obtain a membrane having a thickness of 200μ and it was used for the electrolysis of an aqueous solution of sodium chloride in the same condition.

On the other hand, the acid type membrane was further treated in propanol containing 1% HCl at 70° C. for 5 hours to convert the ion-exchange groups to propyl ester groups and it was press-molded at 190° C. under the pressure of 10 Kg/cm² for 5 minutes and the resulting membrane was hydrolyzed and it was used for the electrolysis of an aqueous solution of sodium chloride in the same condition.

In Table 1, the properties of the membranes at the initiation or after using it for 360 days and the properties of the membranes reproduced by the heat treatment in the acid type or the heat treatment in the ester type are shown.

Table 1:

| Properties of membrane | Exp. 1 | Exp. 2 | Exp. 3 | Exp. 4 |
|---|---|---|---|---|
| Initial time: | | | | |
| Concentration of NaOH (%) | 40 | 40 | 40 | 40 |
| Current efficiency for NaOH (%) | 91 | 95 | 94 | 96 |
| Cell voltage (volt) | 3.8 | 3.7 | 3.7 | 3.9 |
| After 360 days: | | | | |
| Concentration of NaOH (%) | 40 | 40 | 40 | 40 |
| Current efficiency for NaOH (%) | 85 | 90 | 90 | 88 |
| Cell voltage (volt) | 3.9 | 3.8 | 3.8 | 4.0 |
| Heat treatment in acid type: | | | | |
| Concentration of NaOH (%) | 40 | 40 | 40 | 40 |
| Current efficiency for NaOH (%) | 90 | 93 | 93 | 94 |
| Cell voltage (volt) | 3.8 | 3.7 | 3.7 | 3.9 |
| Heat treatment in ester type: | | | | |
| Concentration of NaOH (%) | 40 | 40 | 40 | 40 |
| Current efficiency for NaOH (%) | 90 | 94 | 93 | 93 |
| Cell voltage (volt) | 3.7 | 3.7 | 3.7 | 3.9 |

EXAMPLE 5

A copolymer of tetrafluoroethylene and $CF_2=CFO(CF_2)_3COOCH_3$ which had an ion-exchange capacity of 1.50 meq/g and $T_Q$ of 225° C. was swollen in trichlorotrifluoroethane and the swollen mixture was stirred by a homomixer at 5000 rpm. A fine powder of polytetrafluoroethylene (specific surface area: 9.0 m²/g; secondary aggregated particle diameter of 470μ) was added to the swollen mixture so as to form the compositions A and B shown in Table 2. Each of the compositions A and B was dried to remove trichlorotrifluoroethane and the fibrile of polytetrafluoroethylene was formed by kneading by a roller mill having two rollers (diameter of 4 inch; gap of 0.5 mm) at the temperature of 150° C. at a roller velocity of 8 rpm or 16 rpm for 10 minutes to obtain a sheet containing fibrile of polytetrafluoroethylene. The sheet was taken out from the roller mill and cut into pellets and extruded by an extruder having an inner diameter of a barrel of 65 mm at 230° C. to obtain a membrane having a width of 120 mm, a length of 220 cm and a thickness of about 280μ. The membrane was treated in 25% NaOH at 90° C. for 16 hours to convert the ion-exchange groups of —COOCH₃ to —COONa. A reinforced cation exchange membrane which is used as a diaphragm for an electrolysis of an alkali metal salt is obtained.

The mechanical properties and the electrochemical properties of the membranes are shown in Table 2.

Table 2

| | Example 5 A | Example 5 B |
|---|---|---|
| Content of fibrile of polytetrafluoroethylene (wt.%) | 6 | 10 |
| Tear strength | | |

Table 2-continued

| | Example 5 A | Example 5 B |
|---|---|---|
| (Kg/cm) | 6 | 14 |
| Bending resistance test (bending times) | $5 \times 10^3$ | $4 \times 10^4$ |
| NaOH current efficiency for production of 40% NaOH (%) | 96 | 96 |
| Cell voltage (volt) | 3.7 | 3.7 |

In accordance with the process of Example 1 except using the cation exchange membrane in an electrolytic cell having a membrane effective area of 2 m² and a space of the electrodes of 1.0 cm, the electrolysis of the aqueous solution of sodium chloride was carried out.

After continuing the electrolysis for 450 days, the electrolytic cell was disassembled and the membrane was taken out. In accordance with the process of Example 1, the membrane was converted to the acid type and the membrane was pulverized by a hummer mill and the pulverized acid type powder (diameter of about 300μ) was extruded by an extruder having an inner diameter of barrel of 20 mm at 230° C. to obtain a membrane having a width of 14 cm and a thickness of 280μ. The membrane was used for the electrolysis of the aqueous solution of sodium chloride.

On the other hand, the pulverized acid type powder was treated with methanol at 60° C. for 16 hours to convert the ion-exchange groups to methyl ester groups and it was extruded by an extruder having an inner diameter of barrel of 20 mm at 230° C. to obtain a membrane having a width of 14 cm and a thickness of 280μ. The membrane was used for the electrolysis of the aqueous solution of sodium chloride.

In Table 3, the properties of the membranes at the initiation or after using it for 450 days and the properties of the membranes reproduced by the heat treatment in the acid type or the heat treatment in the ester type are shown.

Table 3

| Properties of membrane | Example 5 A | Example 5 B |
|---|---|---|
| Initial time: | | |
| Concentration of NaOH (%) | 40 | 40 |
| Current efficiency for NaOH (%) | 96 | 96 |
| Cell voltage (volt) | 3.7 | 3.7 |
| After 450 days: | | |
| Concentration of NaOH (%) | 40 | 40 |
| Current efficiency for NaOH (%) | 91 | 91 |
| Cell voltage (volt) | 3.8 | 3.8 |
| Heat treatment in acid type: | | |
| Concentration of NaOH (%) | 40 | 40 |
| Current efficiency for NaOH(%) | 94 | 94 |
| Cell voltage (volt) | 3.7 | 3.7 |
| Heat treatment in ester type: | | |
| Concentration of NaOH (%) | 40 | 40 |
| Current efficiency for NaOH(%) | 94 | 94 |
| Cell voltage (volt) | 3.8 | 3.8 |

What is claimed is:

1. In a method of regenerating the electrochemical properties of cation exchange membrane of a carboxylic acid type fluorinated polymer having ion exchange groups of $+COO)_mM$ wherein M represents an alkali metal or an alkaline earth metal; and $m$ represents a valence of M, an improvement which comprises converting the ion exchange groups of $+COO)_mM$ to the corresponding acid or ester groups of —COOR wherein R represents hydorgen or a $C_1$-$C_5$ alkyl group and heat-treating the fluorinated polymer having said —COOR groups at a temperature greater than that at which said fluorinated polymer has a volumetric melt flow rate of 0.1 mm³/sec and below the thermal decomposition temperature of said fluorinated polymer.

2. The method of claim 1 wherein the fluorinated polymer having the ion exchange groups of $+COO)_mM$ is contacted with an acid then, with an alcohol having 1 to 5 carbon atoms to convert the ion exchange groups of $+COO)_mM$ to the groups of —COOR.

3. The method of claim 1 wherein said heat-treatment is at a temperature wherein the volumetric melt flow rate is at least 1.0 mm³/second and lower than the thermal decomposition temperature of said fluorinated polymer.

4. The method of claim 1 wherein the heat treatment is carried out at higher than 130° C. and lower than a thermal decomposition temperature of the fluorinated polymer.

5. The method of claim 1 wherein the cation exchange membrane is pulverized to form powder or granules before converting the ion exchange groups of $+COO)_mM$ to the groups of —COOR.

6. The method of claim 1 wherein the cation exchange membrane is pulverized to form powder or granules and it is heat-treated under melting it to form a membrane during the heat-treatment.

7. The method of claim 1 wherein the cation exchange membrane of the carboxylic acid type fluorinated polymer has an ion exchange capacity of 0.5 to 2.5 meq/g polymer.

8. The method of claim 1 wherein the fluorinated polymer having the acid or ester goups of —COOR has a volumetric melt flow rate of 100 mm³/second at 130° to 380° C.

9. The method of claim 1 wherein the fluorinated polymer for the cation exchange membrane comprises main units of

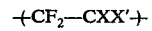 (a)

and b) 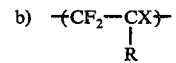

wherein
X represents fluorine, chlorine, hydrogen, or —$CF_3$;
X' represents X or $CF_3(CF_2)_m$;
$m$ represents 1 to 5; and
Y represents —P—A or —O—$(CF_2)_n$(P, Q, R) A,
wherein
P represents —$(CF_2)_a$(CXX')$_b$(CF_2)$_c$;
Q represents —$(CF_2$—O—CXX')$_d$;
R represents —(CXX'—O—CF_2)$_e$;
P, Q and R are arranged in optional order;
X and X' are defined above;
$n$ represents 0 or 1;
$a, b, c, d$ and $e$ respectively represent 0 to 6;
A represents —COOH or —CN —COF, —COOR, —COOM, —$CONR_2R_3$ which can be converted to —COOH by hydrolysis or neutralization;
$R_1$ represents a $C_1$-$C_{10}$ alkyl group;
M represents an alkali metal or quaternary ammonium group; and
$R_2$ and $R_3$ respectively hydrogen or a $C_1$-$C_{10}$ alkyl group.

10. The method of claim 1 wherein the cation exchange membrane contains fibriles of polytetrafluoroethylene or a copolymer of tetrafluoroethylene prior to regeneration.

11. The method of claim 10 wherein 1 to 25 wt. parts of the fibriles of polytetrafluoroethylene or a copolymer of tetrafluoroethylene or a copolymer of tetrafluoroethylene is combined with 100 wt. parts of the cation exchange membrane of fluorinated polymer.

12. The method of claim 10 wherein the cation exchange membrane of fluorinated polymer before and after regeneration is reinforced with a cloth made of polytetrafluoroethylene or a copolymer of tetrafluoroethylene.

* * * * *